United States Patent
Linke (10) Patent No.: US 10,858,228 B2
(45) Date of Patent: Dec. 8, 2020

(54) LIFTING AND TRANSPORT APPARATUS FOR A HEAVY LOAD

(71) Applicant: Siemens Aktiengesellschaft, Munich (DE)

(72) Inventor: Dietmar Linke, Herzogenaurach (DE)

(73) Assignee: SIEMENS AKTIENGSELLSCHAFT

( * ) Notice: Subject to any disclaimer, the term of this patent is extended or adjusted under 35 U.S.C. 154(b) by 305 days.

(21) Appl. No.: 15/563,759

(22) PCT Filed: Apr. 4, 2016

(86) PCT No.: PCT/EP2016/057311
§ 371 (c)(1),
(2) Date: Jan. 5, 2018

(87) PCT Pub. No.: WO2016/169751
PCT Pub. Date: Oct. 27, 2016

(65) Prior Publication Data
US 2018/0362310 A1     Dec. 20, 2018

(30) Foreign Application Priority Data
Apr. 21, 2015  (DE) .......................... 10 2015 207 181

(51) Int. Cl.
*B66F 9/075*     (2006.01)
*B65G 7/00*     (2006.01)
(Continued)

(52) U.S. Cl.
CPC ............ *B66F 9/07577* (2013.01); *B65G 7/00* (2013.01); *B65G 7/02* (2013.01); *F01D 25/285* (2013.01); *H02K 15/00* (2013.01)

(58) Field of Classification Search
CPC ....... B66F 9/07577; H02K 15/00; B65G 7/00; B65G 7/02; F01D 25/285
See application file for complete search history.

(56) References Cited

U.S. PATENT DOCUMENTS 4,392,662 A     7/1983    Hoglinger
5,575,607 A    11/1996    Grout et al.
(Continued)

FOREIGN PATENT DOCUMENTS

CH          626856 A5    12/1981
DE          4126728    *  2/1993    ............... B66F 9/06
(Continued)

OTHER PUBLICATIONS

PCT International Search Report for PCT International Application No. PCT/EP2016/057311, dated Jun. 20, 2017.
(Continued)

*Primary Examiner* — Saul Rodriguez
*Assistant Examiner* — Ashley K Romano
(74) *Attorney, Agent, or Firm* — Schmeiser, Olsen & Watts LLP (57) ABSTRACT

A lifting and transport apparatus for lifting and transporting a heavy load, including a frame that can be moved back and forth at least in a horizontal displacement direction, the frame having four vertical supports of adjustable length which are designed as lifting supports, each with an assigned lifting device, there also being securing device provided on the frame for the releasable attachment of the heavy load, wherein the frame includes at least eight vertical supports of adjustable length. Also disclosed is a method for transporting a heavy load using a lifting and transport apparatus.

16 Claims, 5 Drawing Sheets

(51) Int. Cl.
*B65G 7/02* (2006.01)
*F01D 25/28* (2006.01)
*H02K 15/00* (2006.01)

(56) References Cited

U.S. PATENT DOCUMENTS

| | | | |
|---|---|---|---|
| 6,068,073 A | 5/2000 | Roston et al. | |
| 6,095,537 A * | 8/2000 | Cozza | A47F 5/108 280/47.34 |
| 7,311,487 B1 * | 12/2007 | Crossley | B65G 7/02 414/331.06 |
| 7,341,164 B2 * | 3/2008 | Barquist | F16M 11/32 220/592.03 |
| 8,418,787 B2 | 4/2013 | Bouhraoua et al. | |
| 9,587,408 B1 * | 3/2017 | Brannon | E04G 3/22 |
| 9,598,272 B2 * | 3/2017 | Ivanchenko | B66F 9/065 |
| 10,144,463 B2 * | 12/2018 | Flusche | B62D 57/032 |
| 2003/0127259 A1 * | 7/2003 | Logstrup | B62B 5/02 180/23 |
| 2004/0213653 A1 * | 10/2004 | Tomko | F01D 25/285 414/458 |
| 2006/0151218 A1 | 7/2006 | Goren | |
| 2008/0028973 A1 * | 2/2008 | Hayashi | B62D 65/18 104/89 |
| 2012/0055898 A1 | 3/2012 | Sparrow | |
| 2012/0233837 A1 * | 9/2012 | Bartlam | F01D 5/3038 29/426.1 |
| 2015/0147151 A1 * | 5/2015 | Mogle, II | B25B 11/02 414/800 |

FOREIGN PATENT DOCUMENTS

| | | |
|---|---|---|
| DE | 4126728 A1 | 2/1993 |
| DE | 102008048356 A1 | 4/2010 |
| DE | 102009051986 A1 | 5/2011 |
| GB | 2154543 A | 9/1985 |
| JP | S5126701 A | 3/1976 |
| JP | S5391178 U | 7/1978 |
| JP | S61206596 U | 12/1986 |
| WO | WO 0153137 A1 | 7/2001 |

OTHER PUBLICATIONS

Fagioli: "Fagioli—Gantry Cranes lifting of a generator", Youtube, pp. 1, XP054978845, Gefunden im Internet: URL: https://www.youtube.com/watch?v=suaaSBbMVOo; [gefunden am Nov. 8, 2018]; 2012.

Non-English European Exam Report for Application No. 16 714 858.4 dated Nov. 16, 2018.

Non-English European Examination Report for Application No. 16714858.4, dated Oct. 29, 2019.

* cited by examiner

LIFTING AND TRANSPORT APPARATUS FOR A HEAVY LOAD

CROSS-REFERENCE TO RELATED APPLICATIONS

This application claims priority to PCT Application No. PCT/EP2016/057311, having a filing date of Apr. 4, 2016, based off of German application No. DE 102015207181.2 having a filing date of Apr. 21, 2015, the entire contents of both of which are hereby incorporated by reference.

FIELD OF TECHNOLOGY

The following relates to a lifting and transport apparatus for lifting and transporting a heavy load, comprising a frame which is movable back and forth at least in a horizontal movement direction and has four vertical supports of adjustable length, which are designed as lifting supports with one lifting device assigned in each case, and comprising fastening means which are provided on the frame and which serve for the releasable attachment of the heavy load.

BACKGROUND

Embodiments of the present invention also relate to a method for transporting a heavy load using a lifting and transport apparatus according to embodiments of the invention.

Lifting and transport apparatuses of the type mentioned at the beginning are known in a wide variety of configurations and serve for lifting a heavy load at a starting location, transporting the raised heavy load by horizontal movement, and setting it down at a target location.

For example, such a task presents itself if, in a power plant, current-generating generators have to be removed from their operating location or brought to their operating location for maintenance or replacement purposes. In the power plant halls of conventional power plants, the generators usually rest on bases which are raised in relation to the surrounding floor. In this case, the base height can be up to 3.5 m. In case of an overhaul or replacement, the problem of loading a generator from a base-like machine foundation onto a movable platform having multiple axes (modular vehicles, self-propelled modular transporters (SPMT)) which is positioned on the surrounding floor, in particular in front of the power plant hall, therefore specifically arises.

Known lifting and transport apparatuses for lifting and transporting a heavy load usually comprise a frame with a rectangular base area which is able to be moved back and forth in a horizontal movement direction. The frame has, at the corners of its base area, four vertical supports of adjustable length, which are designed as lifting supports with one lifting device assigned in each case. The lifting devices are configured to adjust the length of the lifting supports when the frame is loaded by the weight force of the heavy load. Furthermore, provided on the frame are fastening means which are designed such that the heavy load can be securely fastened to the frame. Synchronous extension of the vertical supports allows the heavy load fastened to the frame to be lifted, while simultaneous shortening of the vertical supports causes the heavy load to be lowered.

In order to transport a heavy load, the lifting and transport apparatus is firstly moved over the heavy load such that in each case two vertical supports are positioned on opposite sides of the heavy load. After the heavy load has been fastened to the frame, the lifting supports are extended further in order to lift the heavy load that is fastened to the frame. The frame with the raised heavy load is then moved horizontally to the target location.

In a power plant hall, however, the space required for using such a lifting and transport apparatus may be insufficient. For example, the lifting and transport apparatus cannot be moved over a generator that is resting on a base if, to the side of the base, there is insufficient space available for the supporting of the frame.

SUMMARY

An aspect relates to creating a lifting and transport apparatus of the type mentioned at the beginning, which is flexible in its use.

In order to achieve the aspect according to embodiments of the invention, the embodiments include a lifting and transport apparatus of the type mentioned at the beginning whose frame comprises at least eight vertical supports of adjustable length.

A significant advantage of a frame having at least eight vertical supports of adjustable length is that, if four supports bear the weight force of the heavy load, the remaining supports can be used in order to overcome in particular stepped differences in height on the transport route by way of "climbing". Correspondingly, the lifting and transport apparatus according to embodiments of the invention can, if required, also be arranged directly on a base. It is thus unimportant whether or not a mounting and movement surface for the supports is available next to the base, this leading to flexible usability of the lifting and transport apparatus according to embodiments of the invention.

Advantageously, the lifting supports and the assigned lifting devices are configured to adjust the lengths of the lifting supports by a maximum of 5 m. This lifting range allows height differences of conventional bases of the type mentioned at the beginning to be overcome.

According to one configuration of the lifting and transport apparatus according to embodiments of the invention, the frame has horizontal cross members and/or horizontal longitudinal members which connect the vertical supports to one another. Moreover, the frame may also have at least one diagonal strut which extends between the horizontal cross members and the longitudinal members and/or the vertical supports. Such members and/or struts are beneficial to the stability of the frame.

Advantageously, the vertical supports are arranged on the frame transversely to the at least one movement direction, so as to be opposite one another in pairs in each case. Correspondingly, the weight force of a heavy load held on the frame is distributed uniformly and is introduced into the foundation.

Preferably, the vertical supports arranged opposite one another transversely to the at least one movement direction are in each case at the same spacing from one another. In other words, the vertical supports are arranged on the frame in two opposite rows, which are oriented parallel with respect to one another and with respect to the horizontal movement direction.

Advantageously, the vertical supports of adjustable length each have a sliding shoe on their lower, free ends or are equipped with rollers. In this way, movement in the horizontal movement direction with the least possible friction is made possible.

In a refinement of embodiments of the present invention, the lifting and transport apparatus has sliding tracks or rails on which the frame is movable, wherein the sliding tracks or rails are designed for holding the sliding shoes or rollers.

In one configuration according to embodiments of the invention, for the lifting and transport apparatus, a controller is provided and is configured to control the movement of the frame in the at least one movement direction and the length adjustment of at least the lifting supports. A central controller makes it possible for length adjustments of at least the lifting supports and the movement direction and movement speed of the frame to be controlled so as to be matched to one another.

According to one variant of the lifting and transport apparatus according to embodiments of the invention, the at least eight vertical supports are designed as lifting supports. In other words, said lifting and transport apparatus has eight supports of identical type which are each equipped with a lifting device. Such a lifting and transport apparatus has particularly high flexibility, since each vertical support is able to adjust its length under load.

According to an alternative variant of the lifting and transport apparatus according to embodiments of the invention, at least four vertical supports of adjustable length are designed as retaining supports, with one extension device and one locking device assigned in each case. The extension devices are designed such that they allow length adjustment of the retaining supports only when the retaining supports are unloaded. The locking devices are configured such that they lock a set length of the retaining supports in such a way that said length is maintained under load. Since, therefore, retaining supports have to meet lower requirements than lifting supports, they are more cost-effective in production than lifting supports.

Preferably, the retaining supports and the assigned extension devices and locking devices are configured to adjust the length of the retaining supports by a maximum of 1.5 m. Such a lifting range allows the heavy load to be kept raised at a maximum of 1.5 m above the surrounding floor.

Advantageously, each lifting support is assigned one retaining support which is preferably arranged adjacent to the lifting support, in particular at a distance of between 0.3 m and 1 m. In this way, pairs of vertical supports are formed at the frame, which each comprise a lifting support and a retaining support. Within each pair, it is possible to effect lifting of the heavy load by length adjustment of the lifting support and, in a next step, to relieve the lifting support of load by subsequently bringing the retaining support to this height.

Lifting supports and retaining supports are preferably arranged in an alternating manner with respect to the at least one movement direction. Consequently, in the at least one movement direction, front supports are retaining supports and rear supports are lifting supports, or front supports are lifting supports and rear supports are retaining supports. These two arrangements of the lifting supports and retaining supports are suitable for the applications of opposite nature where the heavy load is to be transported one step downward, or one step upward.

Furthermore, embodiments of the present invention create a method for transporting a heavy load, in particular a generator, from or onto a base, which is raised in relation to a surrounding floor, using a lifting and transport apparatus according to embodiments of the invention, in which, during the transport of the heavy load, at least one state is assumed in which two vertical supports are supported on the base and two vertical supports are supported on the surrounding floor.

An advantageous refinement of the method according to embodiments of the invention is that, during transport, movement of the frame in the at least one horizontal movement direction and length adjustment of vertical supports occur in an alternating manner.

According to a configuration of the method according to embodiments of the invention, first rail sections or sliding track sections are arranged on the base, and second rail sections or sliding track sections are arranged on the surrounding floor.

BRIEF DESCRIPTION

Some of the embodiments will be described in detail, with reference to the following figures, wherein like designations denote like members, wherein.

DETAILED DESCRIPTION

FIGS. 1 to 5 show a lifting and transport apparatus 1 according to one configuration of embodiments of the present invention which, in the present case, is used to lift a heavy load 2, which rests on a base 3 which is raised in relation to a surrounding floor, from the base 3, wherein a height H of the base 3 is 3.5 m.

The lifting and transport apparatus 1 comprises a frame 4 having eight vertical supports 5, 6 of adjustable length, four of which are designed as lifting supports 5 and the remaining four of which are designed as retaining supports 6. Each lifting support 5 is assigned one lifting device (not shown), which is configured to adjust the lengths of the lifting supports 5 under loading with the inherent weight of the heavy load 2 by a maximum of 5 m.

In the present case, the lifting devices are hydraulically actuable, although in principle other types of actuation are also possible. Each retaining support 6 is assigned one extension device (not shown) and a locking device (not shown). The extension devices and locking devices are configured to adjust, in particularly steplessly, the lengths of the retaining supports 6 by a maximum of 1.5 m and to lock said lengths as desired within this range. The retaining supports 6 are configured only for load-free length adjustment and may have for example a motor drive as extension device. However, alternatively, the extension devices may also be formed for manual actuation with a crank drive or the like.

Furthermore, the frame 4 comprises a plurality of horizontal cross members 7 and horizontal longitudinal members 8 which connect the vertical supports 5, 6 to one another. A plurality of diagonal struts 9 are provided between the horizontal cross members 7, the horizontal longitudinal members 8 and the vertical supports 5, 6 in order to stiffen the frame 4.

The frame 4 is movable back and forth in a horizontal movement direction X. For this purpose, the vertical supports 5, 6 each have on their lower, free ends a roller shoe 10 with rollers (not shown) which is held in rails 11 which are arranged on opposite sides of the generator 2 in the horizontal movement direction X. In this case, each rail 11 is subdivided into a first rail section 12, which is arranged on the base 3, and a second rail section 13, which is arranged on the floor surrounding the base 3. Alternatively, at the free ends of the vertical supports 5, 6, it is also possible to provide sliding shoes which are held on a sliding track.

Transversely to said movement direction X, the vertical supports are arranged so as to be opposite one another in pairs in each case, and vertical supports 5, 6 arranged opposite one another have in each case the same spacing from one another. In other words, the vertical supports 5, 6 are arranged on both sides of the generator 2 in two opposite rows. In this case, each lifting support 5 is assigned one retaining support 6 which is positioned adjacent to the lifting support 5 and is at a distance therefrom of between 0.3 m and 1 m. Moreover, the pairs of assigned vertical supports 5, 6 are arranged such that lifting supports 5 and retaining supports 6 alternate with respect to the at least one movement direction X.

Provided on the cross members 7 of the frame 4 as fastening means 14 are slinging means to which the generator 2 is attached with steel ropes. Furthermore, a controller (not shown) is provided and is configured to control movement of the frame 4 in the movement direction X and the length adjustment of at least the lifting supports 5, but preferably of all vertical supports 5, 6.

In order to lift the generator 2 from the base 3, firstly first rail sections 12 are arranged on opposite sides of the generator 2 parallel to the horizontal movement direction X. Subsequently, second rail sections 13 are fastened to the floor surrounding the base 3 in such a way that they continue the first rail sections 12 at a height of the surrounding floor.

Figure 1:
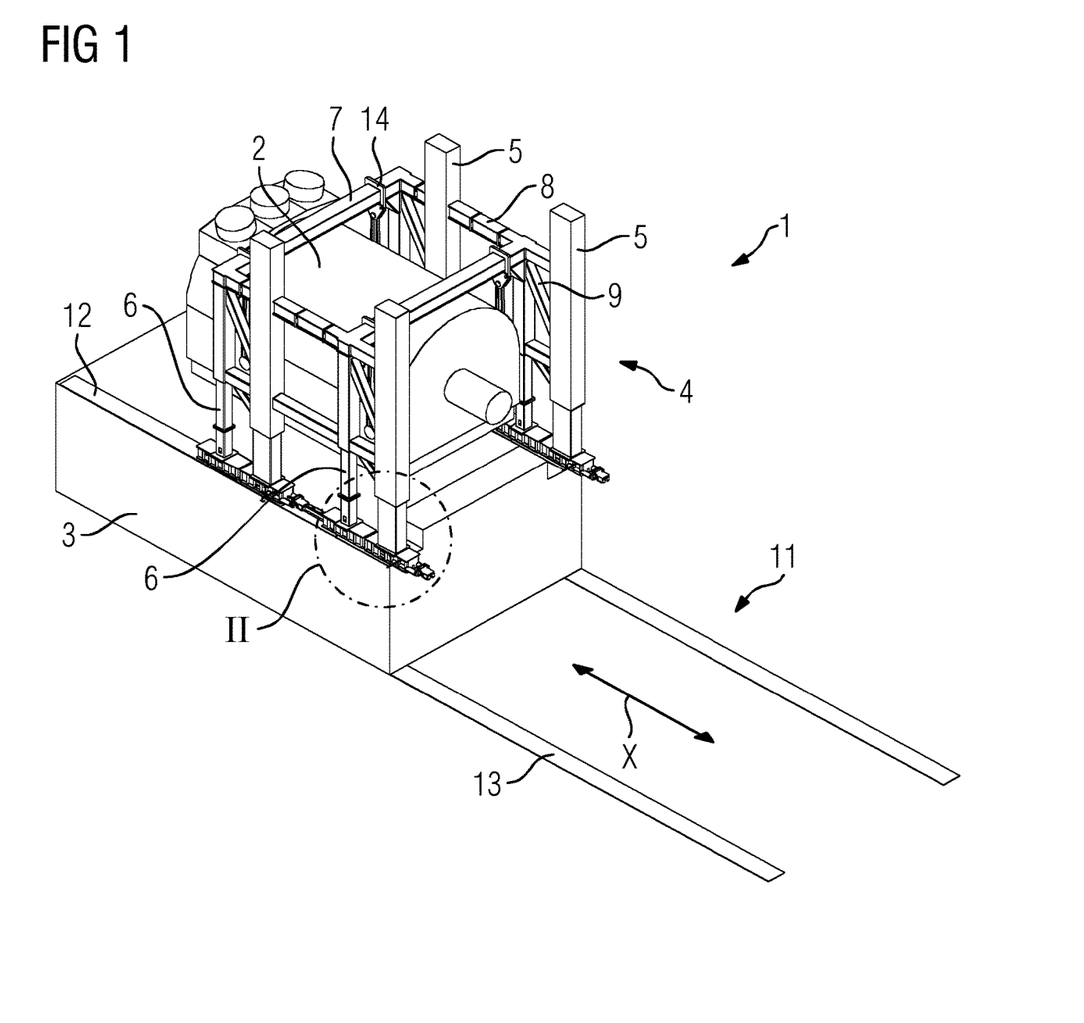
FIG. 1 is a perspective view of a lifting and transport apparatus.
Figure 2:
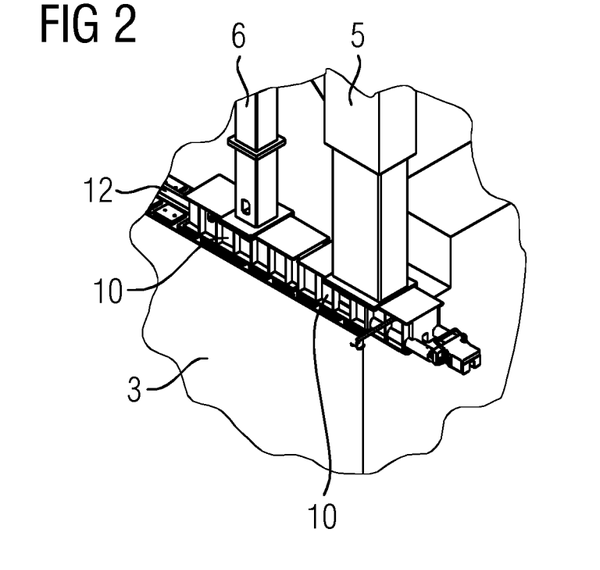
FIG. 2 is an enlarged view of the section denoted with the reference sign II in FIG. 1.
Figure 3:
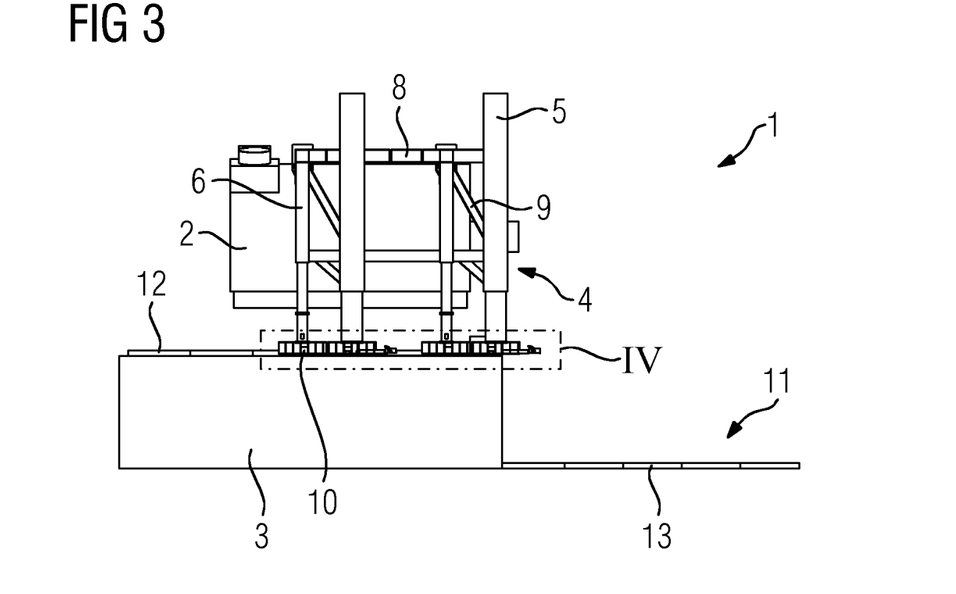
FIG. 3 is a side view of the lifting and transport apparatus illustrated in FIG. 1.
Figure 4:
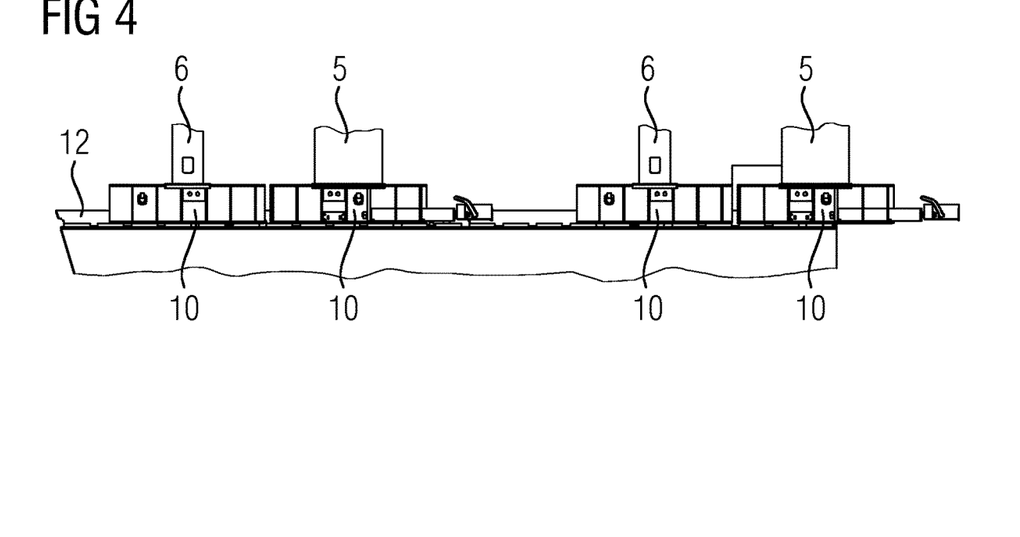
FIG. 4 is an enlarged view of the section denoted with the reference sign IV in FIG. 3.
Figure 5:
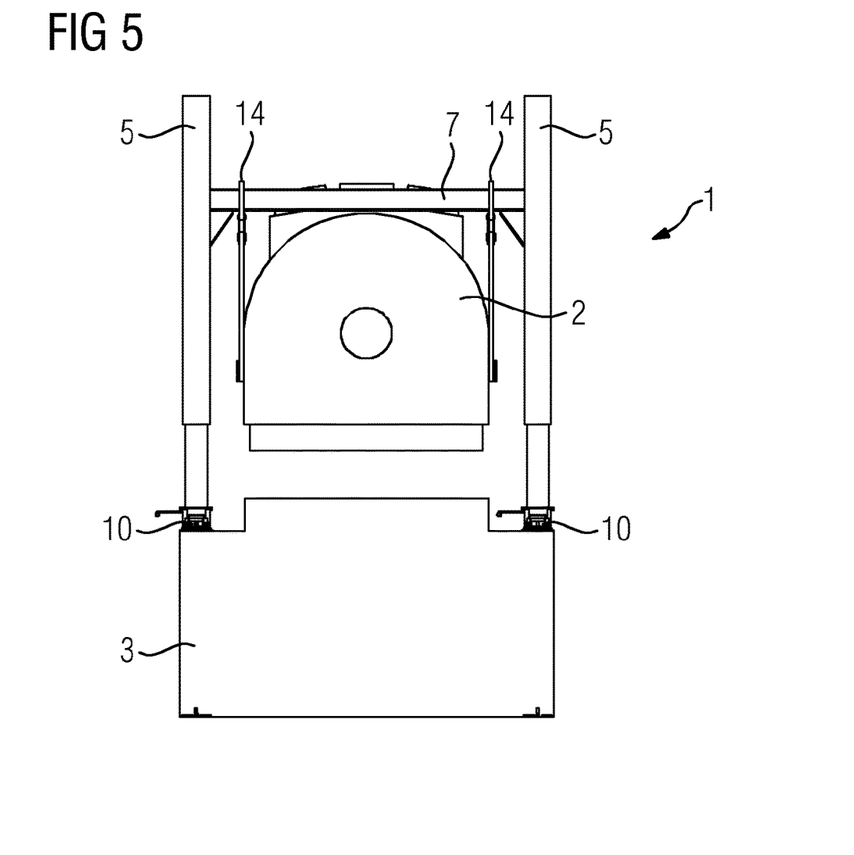
FIG. 5 is a front view of the lifting and transport apparatus illustrated in FIG. 1.
Figure 6:
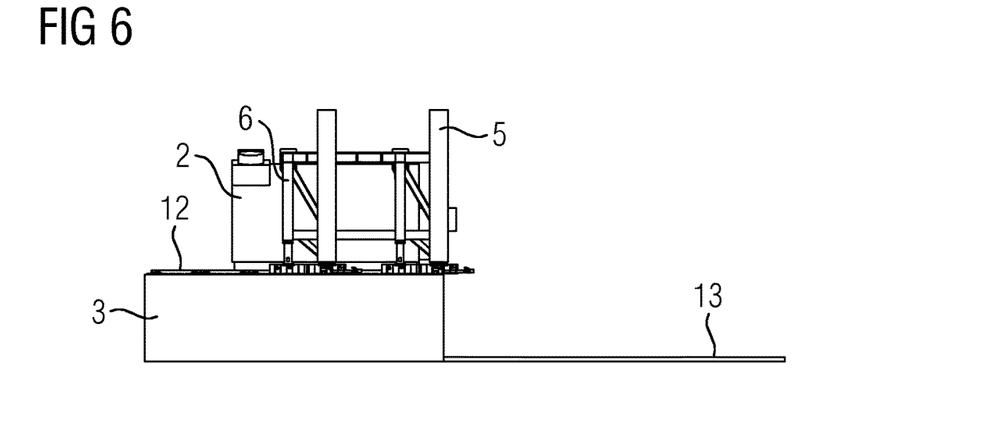
FIG. 6 is a side view of a first state of the lifting and transport apparatus, illustrated in FIGS. 1 to 5, while a heavy load is lifted from a base.
Figure 7:
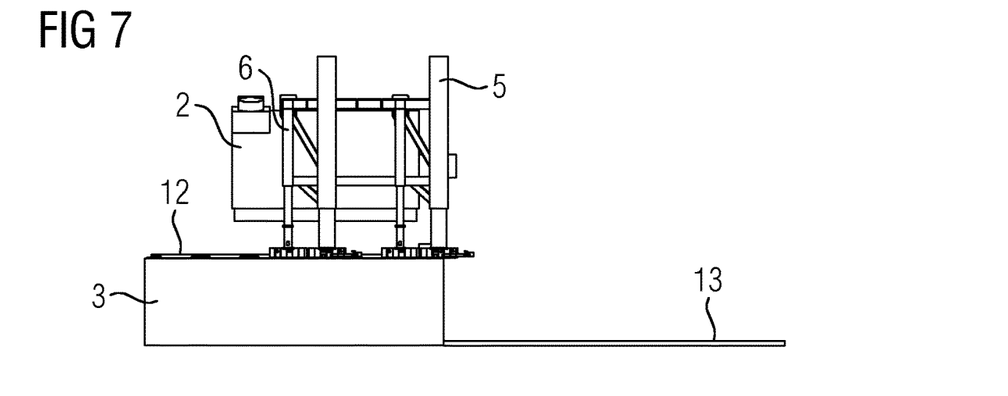
FIG. 7 is a side view of a second state of the lifting and transport apparatus, illustrated in FIGS. 1 to 5, while a heavy load is lifted from a base.
Figure 8:
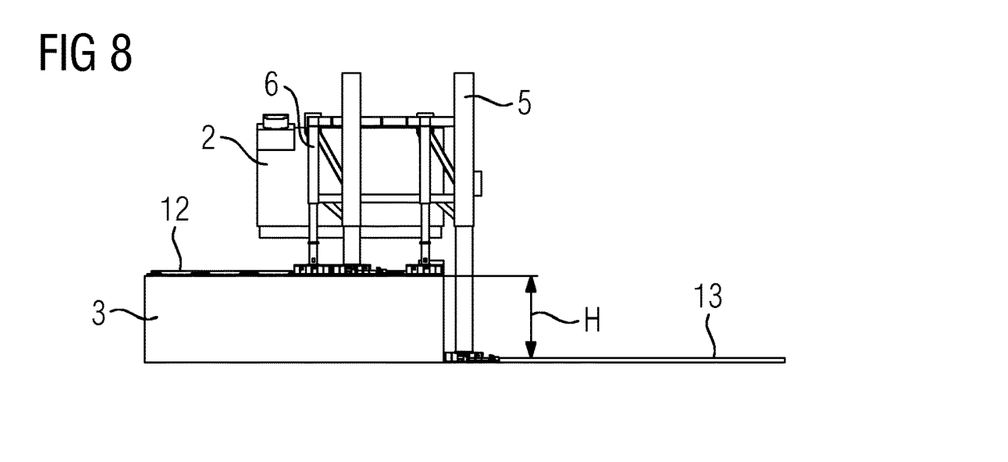
FIG. 8 is a side view of a third state of the lifting and transport apparatus, illustrated in FIGS. 1 to 5, while a heavy load is lifted from a base.
Figure 9:
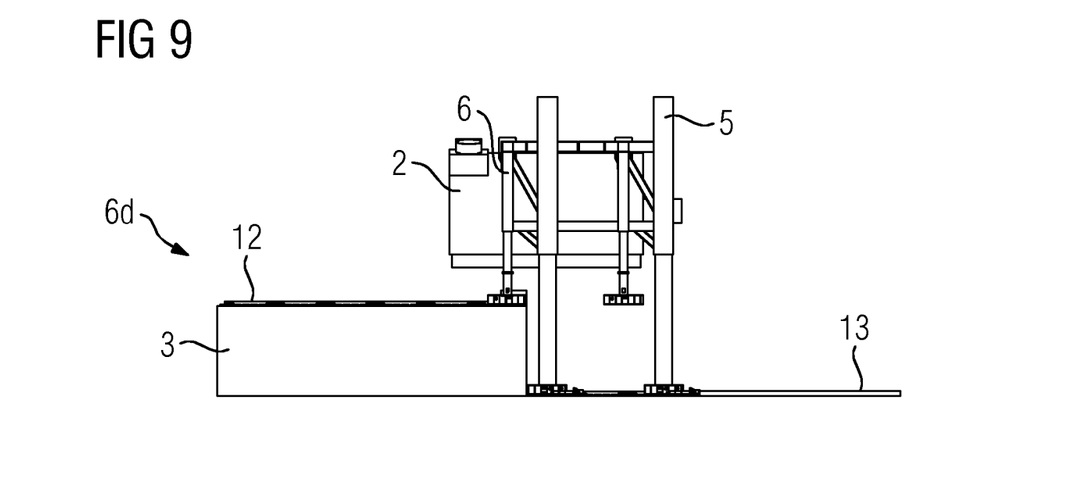
FIG. 9 is a side view of a fourth state of the lifting and transport apparatus, illustrated in FIGS. 1 to 5, while a heavy load is lifted from a base.
Figure 10:
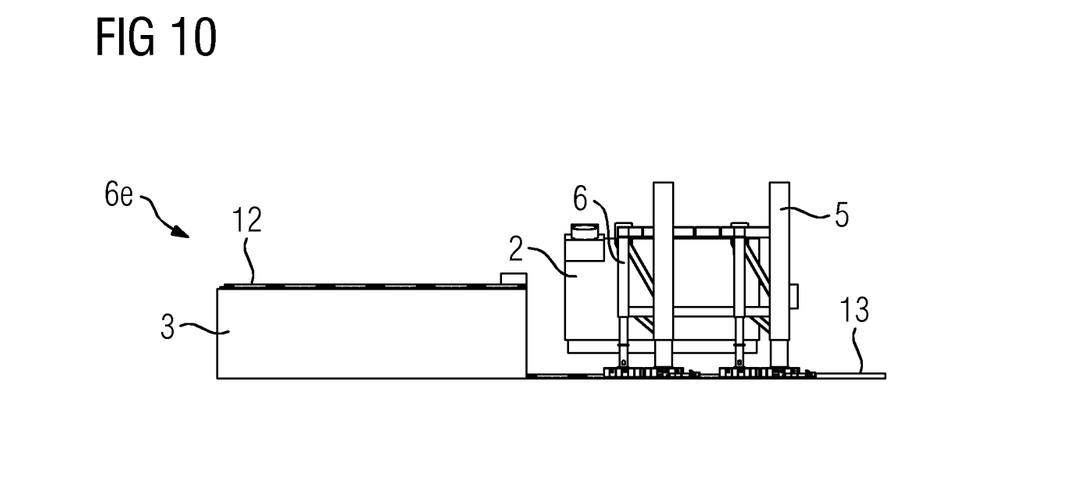
FIG. 10 is a side view of a fifth state of the lifting and transport apparatus, illustrated in FIGS. 1 to 5, while a heavy load is lifted from a base.

The frame 4 of the lifting and transport apparatus 1 is placed on the base 3 in such a way that, in the movement direction X of the frame 4, the vertical supports 5, 6 are arranged on opposite sides of the generator 2, and so the front vertical supports are lifting supports 5 and the rear vertical supports are retaining supports 6. Subsequently, the generator 2 is attached to the frame 4 using the fastening means 14 (state according to FIG. 6). The generator 2 is lifted by extension of the lifting supports 5 such that the frame 4 with the raised generator 2 is horizontally movable on the base 3. The retaining supports 6 are then extended such that they reach the base 3, and are locked in this state (state according to FIG. 7). Together with the raised generator 2, the frame 4 is moved horizontally in the movement direction X until the front lifting supports 5 have left the base 3 and no longer bear load. The frame 4 now stands on the retaining supports 6 assigned to said front lifting supports 5. In a further step, the front lifting supports 5 are extended such that they reach the second rail sections 13 on the surrounding floor (state according to FIG. 8). The frame 4 with the raised generator 2 is now moved further horizontally until only the rear retaining supports 6 stand on the base 3. In this state, the frame 4 rests on the front lifting supports and the rear retaining supports 6, while the lifting supports 5 assigned to the latter bear no load and are extended until they reach the second rail sections 13 (state according to FIG. 9). After further movement of the frame 4 in the horizontal movement direction X, when the rear retaining supports 6 have left the base 3, all lifting supports 5 are shortened such that the retaining supports 6 reach the second rail sections 13 on the surrounding floor (state according to FIG. 10). In this state, it is possible for the frame 4, with the raised generator 2, on the surrounding floor to be moved horizontally out of the power plant hall to the modular vehicle in order to be set down onto the latter for further transport.

In order to transport a generator 2 from a surrounding floor onto a base 3 which is raised in relation to the surrounding floor and which serves as a machine foundation, the above-described method steps are essentially carried out in reverse order, with the proviso that, firstly, the frame 4 has to be arranged in the horizontal direction X in such a way that front vertical supports are designed as retaining supports 6 and rear vertical supports are designed as lifting supports 5. Furthermore, the generator 2 is lifted from the surrounding floor by extension of the lifting supports 5 such that the front retaining supports 6 of the frame 4 can be moved completely over the base 3 until they are arranged above the base 3. The lifting supports 5 are then shortened such that the front retaining supports 6 reach the base 3. This difference allows for the fact that it is difficult to determine in advance the length of the lifting supports 5 which exactly matches the height of the base 3, before the retaining supports 6 are in place on the base 3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lifting and transport apparatus for lifting and transporting a heavy load, comprising a frame which is movable back and forth at least in a horizontal movement direction and has at least eight vertical supports of adjustable length, including four vertical supports of adjustable length which are designed as lifting supports, with one lifting device assigned in each case, and comprising at least one fastener which is provided on the frame and which serve for the releasable attachment of the heavy load, wherein at least four vertical supports of adjustable length of the at least eight vertical supports are designed as retaining supports, with one extension device and one locking device assigned in each case, such that the lengths of the retaining supports can be adjusted and locked, wherein each extension device is designed such that length adjustment of the retaining supports may only occur when the retaining supports are unloaded.

2. The lifting and transport apparatus as claimed in claim 1, wherein the lifting supports and the assigned lifting devices are configured to adjust the lengths of the lifting supports by a maximum of 5 m.

3. The lifting and transport apparatus as claimed in claim 1, wherein the frame has horizontal cross members and/or horizontal longitudinal members which connect the vertical supports to one another.

4. The lifting and transport apparatus as claimed in claim 3, wherein the frame has at least one diagonal strut which extends between the horizontal cross members and the longitudinal members and/or the vertical supports.

5. The lifting and transport apparatus as claimed in claim 1, wherein the vertical supports are arranged on the frame transversely to the at least one movement direction, so as to be opposite one another in pairs in each case.

6. The lifting and transport apparatus as claimed in claim 5, wherein the vertical supports arranged opposite one another transversely to the at least one movement direction are in each case at the same spacing from one another.

7. The lifting and transport apparatus as claimed in claim 1, wherein the vertical supports each have a sliding shoe on their lower, free ends or are equipped with rollers.

8. The lifting and transport apparatus as claimed in claim 7, wherein
sliding tracks or rails on which the frame is movable are provided, wherein the sliding tracks or rails are designed for holding the sliding shoes or rollers.

9. A method for transporting a heavy load from or onto a base, which is raised in relation to a surrounding floor, using a lifting and transport apparatus, wherein, during the transport of the heavy load, at least one state is assumed in which two vertical supports are supported on the base and two vertical supports are supported on the surrounding floor, wherein, during use of the lifting and transport apparatus as claimed in claim 7, first rail sections or sliding track sections are arranged on the base, and second rail sections or sliding track sections are arranged on the surrounding floor.

10. The lifting and transport apparatus as claimed in claim 1, wherein a controller is provided and is configured to control the movement of the frame in the at least one movement direction and the length adjustment of at least the lifting supports.

11. The lifting and transport apparatus as claimed in claim 1, wherein the at least eight vertical supports are designed as lifting supports.

12. The lifting and transport apparatus as claimed in claim 1, wherein the retaining supports and the assigned extension devices and locking devices are configured to adjust the length of the retaining supports by a maximum of 1.5 m.

13. The lifting and transport apparatus as claimed in claim 1, wherein each lifting support is assigned one retaining support which is arranged adjacent to the lifting support at a distance of between 0.3 m and 1 m.

14. The lifting and transport apparatus as claimed in claim 1, wherein lifting supports and retaining supports are arranged in an alternating manner with respect to the at least one movement direction.

15. A method for transporting a heavy load from or onto a base, which is raised in relation to a surrounding floor, using the lifting and transport apparatus as claimed in claim 1, wherein, during the transport of the heavy load, at least one state is assumed in which two vertical supports are supported on the base and two vertical supports are supported on the surrounding floor.

16. The method as claimed in claim 15, wherein, during transport, movement of the frame in the at least one horizontal movement direction and length adjustment of vertical supports occur in an alternating manner.

* * * * *